(12) United States Patent
Kato et al.

(10) Patent No.: US 9,276,509 B2
(45) Date of Patent: Mar. 1, 2016

(54) POWER TOOL HAVING A BRUSHLESS MOTOR AND A CONTROL UNIT FOR CONTROLLING THE BRUSHLESS MOTOR

(71) Applicant: MAKITA CORPORATION, Anjo-shi (JP)

(72) Inventors: Itsuku Kato, Anjo (JP); Motohiro Omura, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 69 days.

(21) Appl. No.: 14/165,711

(22) Filed: Jan. 28, 2014

(65) Prior Publication Data

US 2014/0210379 A1    Jul. 31, 2014

(30) Foreign Application Priority Data

Jan. 28, 2013  (JP) ................. 2013-013427

(51) Int. Cl.
| | | |
|---|---|---|
| *H02P 1/00* | (2006.01) | |
| *H02P 6/08* | (2006.01) | |
| *H02P 6/14* | (2006.01) | |

(52) U.S. Cl.
CPC *H02P 6/08* (2013.01); *H02P 6/142* (2013.01); *H02P 6/145* (2013.01)

(58) Field of Classification Search
CPC .......... B25B 21/00; B25B 23/145; B25F 3/00
USPC ............. 318/139, 599, 811, 461; 173/2, 176, 173/217; 388/937
See application file for complete search history.

(56) References Cited

U.S. PATENT DOCUMENTS

| | | | | |
|---|---|---|---|---|
| 7,007,762 | B2 * | 3/2006 | Yamamoto | 173/1 |
| 7,821,217 | B2 * | 10/2010 | Abolhassani et al. | 318/432 |
| 2005/0057226 | A1 | 3/2005 | Kawakami et al. | |

(Continued)

FOREIGN PATENT DOCUMENTS

| | | |
|---|---|---|
| CN | 100422528 C1 | 10/2008 |
| CN | 102356540 A | 2/2012 |

(Continued)

OTHER PUBLICATIONS

International-style Search Report from the Chinese Patent Office in counterpart Chinese application No. 201310525193.8, dated Nov. 11, 2015 in Global Dossier.

(Continued)

*Primary Examiner* — Rina Duda
(74) *Attorney, Agent, or Firm* — J-TEK Law PLLC; Jeffrey D. Tekanic; Scott T. Wakeman

(57) ABSTRACT

A power tool according to one aspect of one embodiment described in the disclosure includes a brushless motor, a battery voltage detection unit configured to detect a voltage of a battery that provides energy for driving the brushless motor, a rotational position detection unit configured to detect a rotational position of the brushless motor, and a control unit configured to control a drive output supplied to the brushless motor based at least in part on a signal from the rotational position detection unit. The control unit controls a current conduction angle and/or an advance angle supplied to the brushless motor so that, during control of the drive output to the brushless motor, a rotational speed or a conducting current of the brushless motor approaches or reaches a target value, the target value being based at least in part on a battery voltage detected by the battery voltage detection unit.

19 Claims, 5 Drawing Sheets

(56) References Cited

U.S. PATENT DOCUMENTS

| | | | |
|---|---|---|---|
| 2006/0113096 A1* | 6/2006 | Yamamoto | 173/1 |
| 2006/0261766 A1 | 11/2006 | Nakagawa et al. | |
| 2009/0160373 A1 | 6/2009 | Katou et al. | |
| 2009/0295313 A1* | 12/2009 | Suzuki et al. | 318/139 |
| 2011/0284256 A1* | 11/2011 | Iwata | 173/176 |
| 2012/0152583 A1* | 6/2012 | Yanagihara et al. | 173/217 |
| 2012/0191250 A1* | 7/2012 | Iwata et al. | 700/275 |
| 2012/0312573 A1* | 12/2012 | Yanagihara | 173/170 |

FOREIGN PATENT DOCUMENTS

| | | |
|---|---|---|
| CN | 202592346 U | 12/2012 |
| CN | 1866724 A | 11/2015 |
| EP | 1955926 A1 | 8/2008 |
| JP | 2007276042 A | 10/2007 |

OTHER PUBLICATIONS

Office Action from the Chinese Patent Office in counterpart Chinese application No. 201310525193Z, with machine translation generated by Global Dossier, dated Nov. 23, 2015 in Global Dossier.

English translation of Office Action from the Chinese Patent Office dated Nov. 23, 2015 in counterpart Chinese application No. 201310525193.8.

* cited by examiner

| BATTERY VOLTAGE | TARGET ROTATIONAL SPEED |
|---|---|
| 21V | ○○ RPM (HIGH) |
| 20V | ○△ RPM |
| ⋮ | ⋮ |
| 10V | △△ RPM (LOW) |

FIG.4A

| BATTERY VOLTAGE | TARGET CURRENT |
|---|---|
| 21V | ○○ mA (HIGH) |
| 20V | ○△ mA |
| ⋮ | ⋮ |
| 10V | △△ mA (LOW) |

FIG.4B

POWER TOOL HAVING A BRUSHLESS MOTOR AND A CONTROL UNIT FOR CONTROLLING THE BRUSHLESS MOTOR

CROSS-REFERENCE

This application claims priority to Japanese patent application no. 2013-013427 filed on Jan. 28, 2013, the contents of which are fully incorporated herein by reference.

TECHNICAL FIELD

The present invention is generally directed to a power tool having a brushless motor as a motive power source, and, for example, to a power tool having a control unit for controlling a brushless motor power source based on detected conditions.

BACKGROUND ART

Power tools driven by brushless motors are known. In such power tools, the current conduction angle and the advance angle of the brushless motor are fixed or preset based on typical or expected operating conditions. Japanese Unexamined Patent Application Publication No. 2007-276042 (and its family member US 2009/0160373), for example, discloses a power tool having a brushless motor with a current conduction angle and an advance angle that are preset to fixed values in order to optimize drive characteristics of the brushless motor and power tool.

SUMMARY OF THE INVENTION

The construction of power tools of a given type may vary slightly from one unit to another, e.g., due to manufacturing tolerances. If the sensors that detect the motor rotational position are not placed consistently, or if other errors occur during the manufacturing process, the preset values of the conduction angle and/or the advance angle for the brushless motor may not be optimal for a particular power tool (even though they may be optimal for an idealized tool of a given type). Consequently, the rotational speed and the consumed electric current may vary from one power tool to another, and, disadvantageously, this may cause discomfort and/or suboptimal performance for a user of the power tool.

One preferable embodiment, as described in the present disclosure can prevent or at least substantially reduce variations in the drive characteristics of power tools that may be caused by manufacturing differences or errors.

A power tool according to a first aspect of one embodiment described in the present disclosure comprises a brushless motor, a battery voltage detection unit configured to detect a voltage of a battery that provides energy for driving the brushless motor, a rotational position detection unit configured to detect a rotational position of the brushless motor, and a control unit configured to control a drive output supplied to the brushless motor based at least in part on a signal from the rotational position detection unit.

In one embodiment, the control unit may control a current conduction angle and/or an advance angle supplied to the brushless motor so that a rotational speed or a conducting current of the brushless motor approaches or reaches a target value. This target value may be based or set at least in part on a battery voltage detected by the battery voltage detection unit. In this manner, it is possible to provide a power tool that performs in a manner consistent with similar power tools while reducing or preventing variations in drive characteristics between power tools that may be caused by manufacturing differences, such as, for example, errors in mounting the rotational position detection unit(s) proximal to the brushless motor.

In particular, in embodiments described in the present disclosure, the electric current driving the brushless motor may be controlled, and the current conduction angle and/or the advance angle may be controlled such that the rotational speed, the conducting current, and/or one or more related characteristics of the brushless motor approach(es) or reach(es) a target value. It is therefore possible to control the current conduction angle and/or the advance angle when the rotational speed is higher than the target value in order to reduce the rotational speed. It is also possible to generate a large torque from the brushless motor by widening the current conduction angle and/or advancing the advance angle when the rotational speed is lower than the target value. Stated differently, according to embodiments described in the present disclosure, the drive characteristics of the power tool can be better controlled.

In addition, a value based on or otherwise corresponding to the battery voltage may be used as the target value when controlling the current conduction angle and/or the advance angle. This makes it possible to reduce or substantially prevent occurrence of a situation wherein, for example, the target value is set too high for a given battery voltage, which would make the advance angle too high and reduce the drive efficiency of the brushless motor. Namely, according to at least one power tool as described in the present disclosure, the brushless motor, which is the motive power source, can be driven more efficiently, and thus reduce wasted energy consumption (in other words, reduce electric power consumption).

If the control unit is designed to control the current conduction angle and/or the advance angle so that the rotational speed of the brushless motor approaches or reaches the target value (e.g., the target rotational speed), then the control unit may be configured as in a second aspect of one embodiment described in the present disclosure. In such an embodiment, the control unit may be configured such that it increases the rotational speed by widening the current conduction angle and/or advancing the advance angle if the rotational speed of the brushless motor is lower than a target rotational speed and such that it decreases the rotational speed by narrowing the current conduction angle and/or retarding the advance angle if the rotational speed is higher than the target rotational speed.

In addition, if the control unit is configured to control the current conduction angle and/or the advance angle in order to drive the conducting current of the brushless motor toward the target value (in this case, the target current), then the control unit may be configured as in a third aspect of one embodiment described in the present disclosure. In such an embodiment, the control unit may be configured such that it increases the conducting current by widening the current conduction angle and/or advancing the advance angle if the conducting current is smaller than a target current and such that it decreases the conducting current by narrowing the current conduction angle and/or retarding the advance angle if the conducting current is larger than the target current.

Next, in a power tool according to a fourth aspect of one embodiment described in the disclosure, if (the value of) the rotational speed or the conducting current of the brushless motor converges to within a permissible range around the target value, that is, reaches an acceptable value that is acceptably close to the target value, then the control unit may terminate control of the current conduction angle and/or the advance angle by fixing (holding constant) the current conduction angle and/or the advance angle at the then-existing value(s). In other words, the control unit may stop changing the current conduction angle and/or the advance angle and fixes or maintains the current conduction angle and/or the advance angle at the value(s) that is producing the acceptable rotational speed or conduction current.

In addition, in a power tool according to a fifth aspect of one embodiment described in the disclosure, if (the value of) the rotational speed or the conducting current of the brushless motor remains within the permissible range for a specified time or longer, the control unit may terminate control of the current conduction angle and/or the advance angle by fixing or holding constant the current conduction angle and/or the advance angle at the then-existing value(s).

Thus, in the power tool according to the fourth and fifth aspects of one embodiment described in the disclosure, the control unit may fix or hold constant the current conduction angle and/or the advance angle at the value(s) existing at that time if either (the value of) the rotational speed or the conducting current of the brushless motor converges to within the permissible range or if that state continues for the predetermined time or longer.

Accordingly, after the rotational speed or the conducting current of the brushless motor converges to within the permissible range, even if the load applied to the power tool (and, in turn, the brushless motor) fluctuates and the rotational speed or the conducting current varies, the current conduction angle and/or the advance angle can be maintained at the optimal value without being affected by that load fluctuation.

Next, in a power tool according to a sixth aspect of one embodiment described in the disclosure, prior to starting the drive of the brushless motor, the control unit may detect the battery voltage via the battery voltage detection unit and set the target value based at least in part on that detected battery voltage. Therefore, according to the sixth aspect of one embodiment described in the disclosure, even if the battery voltage fluctuates due to the brushless motor being driven, the target value can be set based on the battery voltage prior to that fluctuation, which makes it possible to properly set the target value corresponding to the battery voltage.

Further objects, embodiments, advantages, effects and designs of the present teachings will be explained in the following, or will become apparent to the skilled person, with the assistance of the exemplary embodiments and the appended Figures.

BRIEF DESCRIPTION OF THE DRAWINGS

FIGS. 4A and 4B are exemplary maps that may be used in setting a target rotational speed or a target current based on a battery voltage.

DETAILED DESCRIPTION OF EMBODIMENTS

An exemplified embodiment as described in the present disclosure is explained below with reference to the drawings. In this embodiment, a motor drive apparatus drives a three-phase brushless motor 2 (hereinafter, simply referred to as a "motor") that serves as a motive power source for a power tool 1, such as a rechargeable circular saw.

Figure 1:
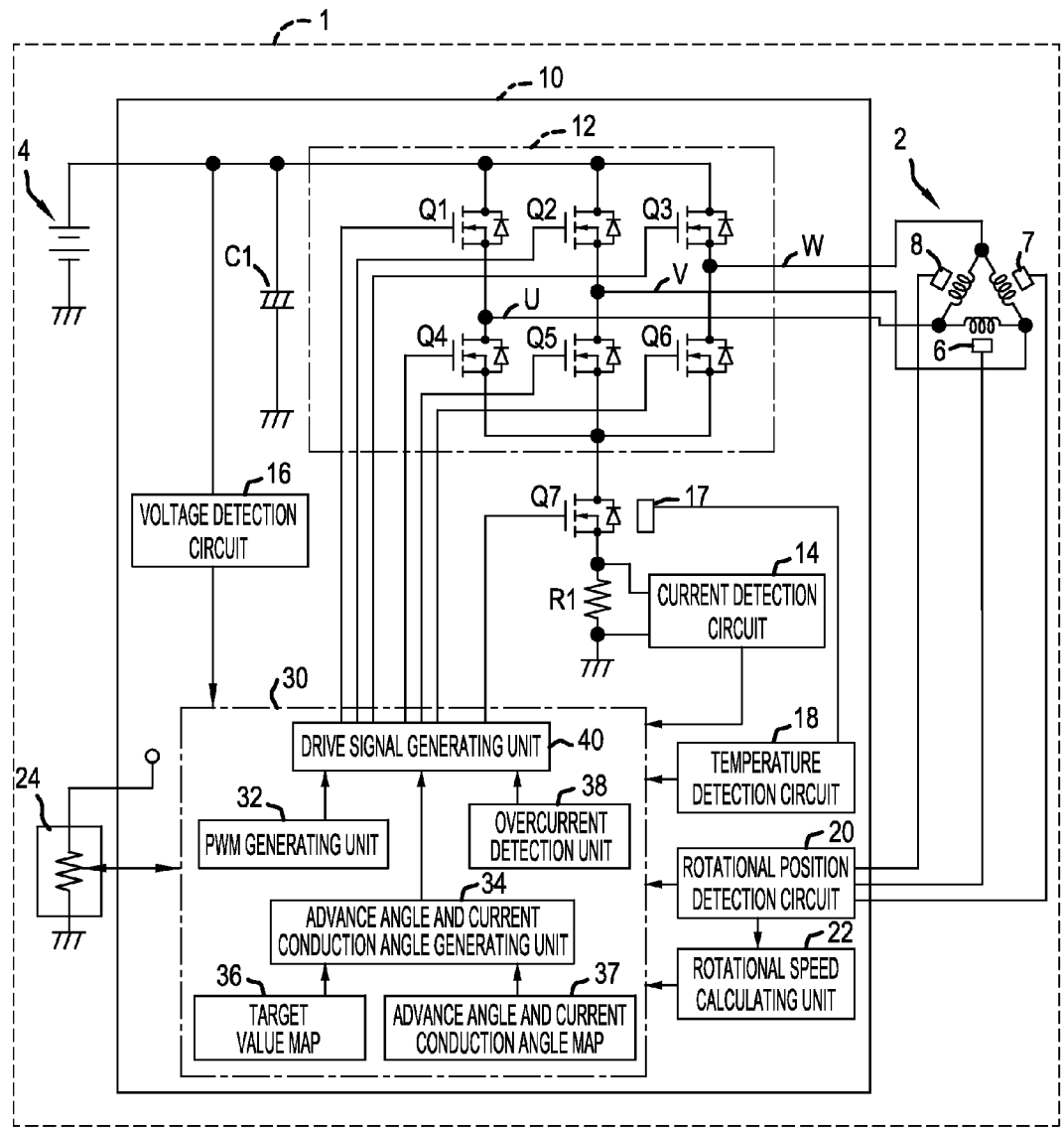
FIG. 1 is a block diagram that shows a representative circuit configuration of a power tool according to an embodiment.

As shown in FIG. 1, a motor drive apparatus 10 comprises a power supply line and a ground line, each coupled to a battery 4, which comprises a direct current (DC) power supply. The power supply line of the motor drive apparatus 10 couples to a positive electrode of the battery 4. The ground line of the motor drive apparatus 10 couples to a negative electrode of the battery 4.

A switching circuit 12 is provided for controlling electric currents that flow to each of the three phases U, V, W of the motor 2. The switching circuit 12 is provided between the power supply line on the positive electrode side and the ground line on the negative electrode side of the battery 4. The switching circuit 12 comprises three switching devices Q1, Q2, Q3 ("high side switches") that are provided at a positive electrode side of a current conducting path between the power supply lines and the terminals of the phases U, V, W of the motor 2. The switching circuit 12 also includes three switching devices Q4, Q5, Q6 ("low side switches") that are provided at a negative electrode side of a current conducting path between the ground line and the terminals of the phases U, V, W of the motor 2.

The negative electrode side of the current conducting path between the switching circuit 12 and the ground line (namely, between the switching devices Q4-Q6 and the ground line on the negative electrode side) is provided with a switching device Q7 (a "cutoff switch") for cutting off current conduction, and a resistor R1.

A current detection circuit 14 detects the electric current flowing to the motor 2 based on the voltages at both ends of the resistor R1 and is connected to both ends of the resistor R1. A temperature sensor 17, the characteristics (output signals) of which vary with the temperature of the cutoff switch Q7, is provided in the vicinity of the cutoff switch Q7.

A temperature detection circuit 18, which detects the temperature of the cutoff switch Q7 via the temperature sensor 17, is connected to the temperature sensor 17. A detection signal from the temperature detection circuit 18 and a detection signal from the current detection circuit 14 are input to a control circuit 30.

A smoothing capacitor C1 is provided between the ground line and the power supply line (i.e., the positive electrode side of the current conducting path) leading from the positive electrode side of the battery 4 to the switching circuit 12, and a voltage detection circuit 16 that detects a voltage (i.e., the battery voltage) is coupled to those lines.

The motor drive apparatus 10 also includes a rotational position detection circuit 20 that detects a rotational position of the motor 2, and a rotational speed calculating circuit 22 that calculates the rotational speed of the motor 2 based on the rotational position detected by the rotational position detection circuit 20.

Furthermore, the detection signals from the voltage detection circuit 16, the rotational position detection circuit 20, and the rotational speed calculating circuit 22 are also input into the control circuit 30. The rotational position detection circuit 20 detects the rotational position (in other words, the rotational angle) of the motor 2 based on detection signals (i.e., Hall effect signals) from three Hall effect sensors 6, 7, 8, which are provided for detecting the rotational position of the motor 2 and are disposed proximal to the motor 2. Specifically, the Hall effect sensors 6, 7, 8 are disposed at 120° intervals around a rotor of the motor 2, and U-phase, V-phase, and W-phase Hall effect signals are output such that the increasing and decreasing directions of these signals invert with every 180° rotation of the rotor.

The rotational position detection circuit 20 shapes the waveforms of the Hall effect signals of the phases U, V, W from the Hall effect sensors 6, 7, 8, and generates pulsed Hall effect signals in which the plus and minus portions of the signals invert with every 180° rotation of the rotor. The rotational position of the motor 2 (specifically, the rotor) is detected in 60° intervals from the edges of the Hall effect signals. In addition, the rotational speed calculating circuit 22 calculates the rotational speed of the motor 2 based on the edge intervals of each of the Hall effect signals.

The control circuit 30 comprises a microcomputer (microprocessor), which includes at least a CPU, ROM, and RAM. The drive of the motor 2 is controlled in accordance with the state and/or position of an operating part (e.g., a trigger switch) 24, which is operated by a user. When the operating part 24 is operated (actuated or squeezed) by the user, the control circuit 30 determines that a drive instruction has been input and drives the motor 2 in accordance with a control input from the operating part 24. If the user ceases to operate (i.e. releases) the operating part 24, the control circuit 30 determines that a deceleration instruction or a stop instruction has been input and applies a brake to the motor 2.

To perform such drive control of the motor 2, the control circuit 30 executes various control programs stored in the ROM and implements the functions of a pulse width modulation (PWM) generating unit 32, an advance angle and current conduction angle generating unit 34, an overcurrent detection unit 38, and a drive signal generating unit 40, which are shown in a functional manner in FIG. 1. Naturally, one or more of these functions may simply be performed by the various control programs such that separate physical units are not required for each (conceptual) function according to the present teachings. Based on the conducting current flowing to the motor 2 that is detected by the current detection circuit 14, the rotational position of the motor 2 that is detected by the rotational position detection circuit 20, and/or other relevant motor characteristics, the advance angle and current conduction angle generating unit 34 references an advance angle and current conduction angle map 37 that is stored in advance in the ROM. Based on the information in the map, the advance angle and current conduction angle generating unit 34 generates an energize instruction specifying an advance angle and a current conduction angle while the motor 2 is being driven and outputs the energize instruction to the drive signal generating unit 40.

In addition, the PWM generating unit 32 calculates a drive duty ratio for PWM control of the electric current supplied to the motor 2, generates a PWM instruction, which indicates (corresponds to) that drive duty ratio, and outputs that instruction to the drive signal generating unit 40.

Furthermore, when the operating part 24 is operated and the drive of the motor 2 is controlled, the drive signal generating unit 40 turns the cutoff switch Q7 on, and generates a drive signal that, in accordance with the energize instruction from the advance angle and current conduction angle generating unit 34, turns on one of the switching devices Q1-Q3 (high side switches) on the positive electrode side and one of the switching devices Q4-Q6 (low side switches) on the negative electrode side that are included in the switching circuit 12 and outputs that drive signal to the switching circuit 12.

In addition, by using the drive signal supplied to either the high side switch or the low side switch as the PWM signal with a drive duty ratio corresponding to the PWM instruction from the PWM generating unit 32, the drive signal generating unit 40 drives that switch according to the indicated duty ratio. As a result, electric currents that correspond to the drive duty ratio flow to the phases U, V, W of the motor 2 and cause the motor 2 to rotate at a speed that corresponds to the control input from the operating part 24.

If the drive current of the motor 2 detected by the current detection circuit 14 exceeds an overcurrent threshold (and thus makes an overcurrent determination), the overcurrent detection unit 38 stops the output of the drive signal from the drive signal generating unit 40; in other words, it stops the drive of the motor 2.

In addition, the control circuit 30 monitors the battery voltage and the temperature of the cutoff switch Q7 based on the detection signals from the voltage detection circuit 16 and the temperature detection circuit 18 and stops the drive control of the motor 2 when the battery voltage drops below a preset threshold and/or the temperature of the cutoff switch Q7 rises above a preset threshold.

Incidentally, the advance angle and current conduction angle generating unit 34 sets the advance angle and current conduction angle while the motor is being driven by referencing the advance angle and current conduction angle map 37. If these parameters were predetermined or were fixed to set values obtained from the advance angle and current conduction angle map 37, and were not adjusted based on a rotational position of the brushless motor, then the user might be subjected to discomfort and/or suboptimal performance due to variations in the drive characteristics of the motor 2 (and, in turn, the power tool 1) from one manufactured article to another due to any error in mounting the Hall effect sensors 6, 7, 8 proximal to the motor 2, any error in mounting the motor 2 to or in a main body of the power tool 1 (not shown), and the like.

Accordingly, in the present embodiment, the advance angle and current conduction angle generating unit 34 regulates the advance angle and the current conduction angle after the drive of the motor 2 has been started using set values from the advance angle and current conduction angle map 37. By subsequently increasing and decreasing the advance angle using the set value as a reference, variations in the drive characteristics may be reduced.

In the present embodiment, a target value map 36 is stored in the ROM of the control circuit 30. The target value map 36 in the present embodiment describes, based on an NT characteristic (rotational speed–torque characteristic), an IT characteristic (electric current–torque characteristic), and/or other relevant characteristics of the motor 2, the relationship between the battery voltage and the rotational speed at which the optimal drive characteristics are obtained. Furthermore, as shown by way of example in FIG. 4A, the target rotational speed is set for each of a plurality of prescribed battery voltages.

Furthermore, based on the target rotational speed set (based on the target value map 36) and the rotational speed of the motor 2 (calculated by the rotational speed calculating circuit 22), the advance angle and current conduction angle generating unit 34 converges the rotational speed of the motor 2 toward the target rotational speed by correcting (i.e., increasing or decreasing) the advance angle during motor drive such that the rotational speed of the motor 2 approaches and/or reaches the target rotational speed.

The motor drive control performed by the control circuit 30 is explained below.

Figure 2:
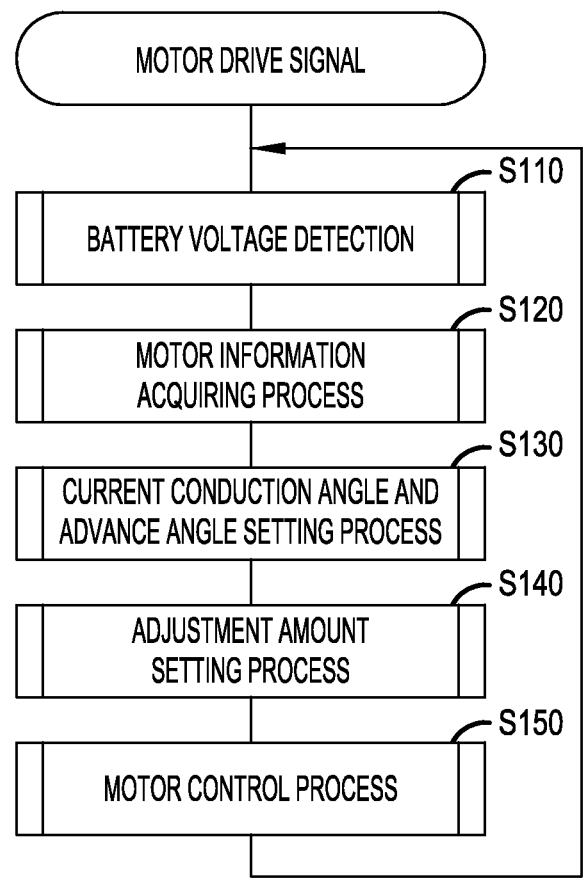
FIG. 2 is a flow chart that illustrates a representative motor drive control method performed by the control circuit.

As shown in FIG. 2, when starting drive control of the motor 2, the control circuit 30, in a step S110 (wherein "S" indicates a reference to a step), reads the battery voltage from the voltage detection circuit 16, and next, in a step S120, the control circuit 30 acquires motor information, such as the rotational speed and the rotational position of the motor 2, needed for drive control of the motor 2. Next, in a step S130, based on the battery voltage and the motor information read in step S110 and step S120, respectively, the advance angle and current conduction angle are set using the advance angle and current conduction angle map 37. In a step S140, the target rotational speed corresponding to the battery voltage is derived using the target value map 36, and an advance angle adjustment amount during motor drive is set such that the rotational speed of the motor 2 approaches or reaches the target rotational speed.

Furthermore, in a step S150, the drive duty ratio for performing PWM control of the voltage impressed on the motor 2 is set and, based on that drive duty ratio, as well as the advance angle and current conduction angle and the advance angle adjustment amount set in steps S130 and S140, the motor 2 is driven by generating the drive signal output to the switching circuit 12. During motor drive control, the sequence of processes of steps S110 to S150 is performed repetitively, and thereby the impressed voltage, the advance angle, the current conduction angle, and the advance angle adjustment amount during motor drive are controlled in a stepwise manner; ultimately, the rotational speed of the motor 2 is regulated to (or approximately to) the target rotational speed.

Figure 5:
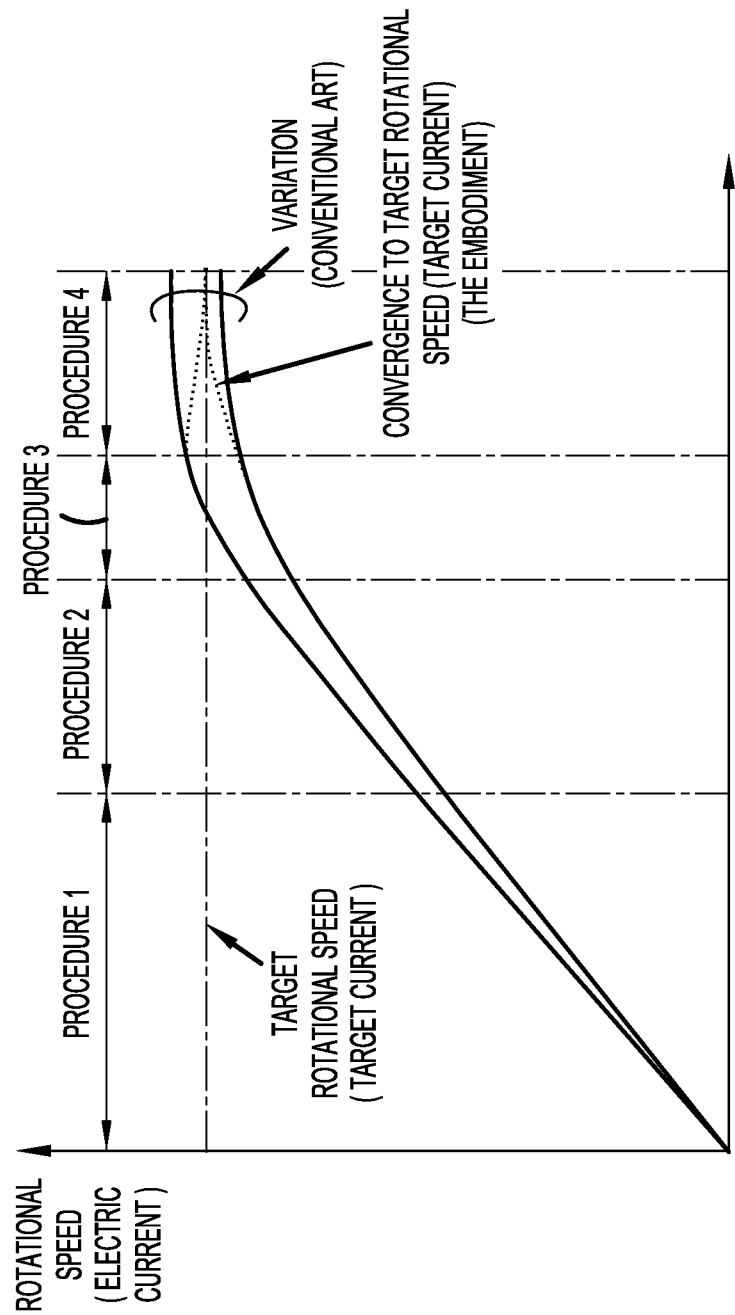
FIG. 5 is an exemplary chart illustrating control results produced by the control circuit of the embodiment.

As shown in FIG. 5, first, when the advance angle and the current conduction angle have been set to their initial values (e.g., an advance angle of 0° and a current conduction angle of 120°), the voltage impressed on the motor 2 is raised to the set value by PWM control (i.e., a procedure 1).

Next, if the rotational speed of the motor 2 exceeds the set value, then the advance angle is increased to the set value set in step S130 (i.e., a procedure 2). Furthermore, if the advance angle is regulated to the set value, then the current conduction angle is increased to the set value set in step S130 (i.e., a procedure 3).

By performing motor control according to procedure 1 through procedure 3 in this manner, the rotational speed of the motor 2 generally converges to the target rotational speed, unless there is variation from one manufactured article to another. However, in actuality, characteristics differ from one manufactured article to another, and therefore the rotational speed of the motor 2 may vary with the manufactured article in an undesirable manner, as shown in FIG. 5.

Therefore, in the present embodiment, if the current conduction angle reaches the set value, then the advance angle is subsequently adjusted in accordance with the advance angle adjustment amount set in step S140, and in this manner the rotational speed of the motor 2 is converged to the target rotational speed (i.e., a procedure 4).

Next, the process of setting the adjustment amount, which is performed in step S140 in order to converge the rotational speed of the motor 2 to the target rotational speed in this manner, will be explained with reference to FIG. 3.

Figure 3:
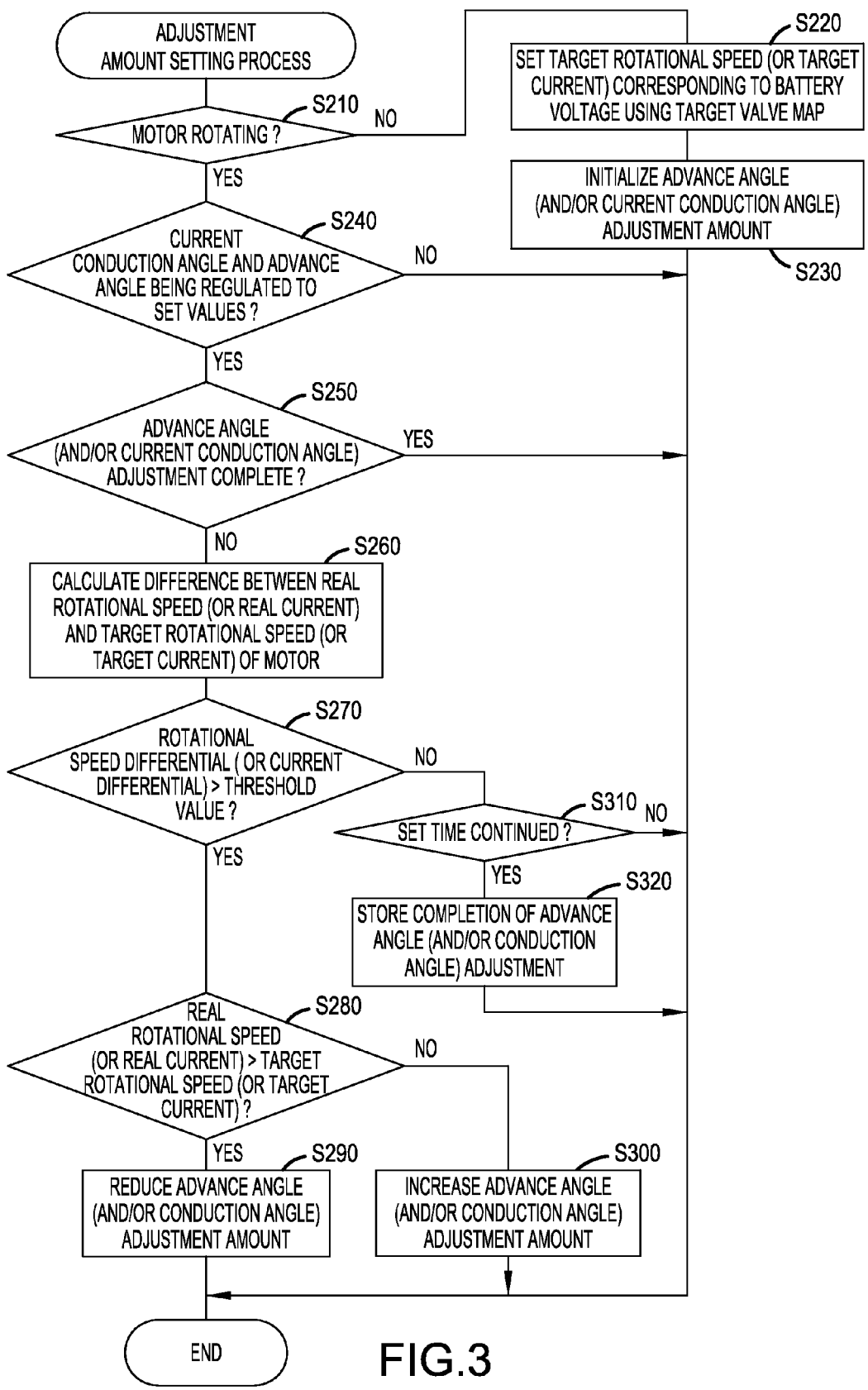
FIG. 3 is a flow chart that illustrates a representative process for setting an adjustment amount performed as part of the method of FIG. 2.

As shown in FIG. 3, in this setting process, first, in a step S210, a determination is made as to whether the motor 2 is presently rotating. If the motor 2 is not rotating, then the process transitions to a step S220 in which the target rotational speed corresponding to the current battery voltage (in other words, the battery voltage when the drive of the motor 2 is stopped) is set using the target value map 36. Furthermore, in a following step S230, an initialization process is performed in which the advance angle adjustment amount is set to an initial value of "0", after which the setting process terminates.

On the other hand, if in step S210 it is determined that the motor 2 is rotating, then the process transitions to a step S240 in which a determination is made as to whether the current conduction angle and the advance angle are being regulated to the set value set in step S130, namely, whether the control of the drive of the motor 2 in accordance with procedure 1 through procedure 3 shown in FIG. 5 has completed.

Furthermore, if the current conduction angle and the advance angle are not yet being regulated to their set values, then the setting process terminates as is. If the current conduction angle and the advance angle are being regulated to their set values, then the process transitions to a step S250, whereupon it is determined whether the advance angle adjustment performed by this setting process has completed.

If the advance angle adjustment is already complete, the setting process terminates. However, if the advance angle adjustment is not yet complete, then the process transitions to a step S260. In step S260, the difference (i.e., the rotational speed difference) between the present rotational speed of the motor 2 calculated by the rotational speed calculating circuit 22 (i.e., the real or actual rotational speed) and the target rotational speed set in step S220 when the rotation of the motor 2 was stopped is calculated.

Furthermore, in a following step S270 it is determined whether that calculated rotational speed difference is greater than a preset threshold value (in other words, whether the rotational speed difference exceeds a permissible range). In particular, if the rotational speed difference is greater than the threshold value, the process transitions to a step S280 in which it is determined whether the real (actual) rotational speed is greater than the target rotational speed.

In step S280, if it is determined that the real (actual) rotational speed is greater than the target rotational speed, then, in a step S290, the advance angle adjustment amount is reduced by a prescribed amount, after which the setting process terminates. In step S280, if it is determined that the real (actual) rotational speed is less than or equal to the target rotational speed, then, in a step S300, the advance angle adjustment amount is increased by a prescribed amount, after which the process terminates. In other words, if the advance angle adjustment amount is reduced, then the advance angle value during motor drive is corrected toward the retarding angle side, and thus the drive torque of the motor 2 decreases and the real (actual) rotational speed falls (decreases). Conversely, if the advance angle adjustment amount is increased, then the advance angle value during motor drive is corrected toward the advance angle side, and the drive torque of the motor 2 increases and the real (actual) rotational speed rises (increases).

Accordingly, by performing steps S280-S300 described above, the advance angle adjustment amount is updated so that the real (actual) rotational speed of the motor 2 approaches or reaches the target rotational speed and, in turn, the advance angle during motor drive is corrected so that the real (actual) rotational speed of the motor 2 approaches or reaches the target rotational speed.

Moreover, if it is determined in step S270 that the rotational speed difference between the real (actual) rotational speed and the target rotational speed is less than or equal to the threshold value, then the process transitions to a step S310, and it is determined whether this state (i.e., real (actual) rotational speed≤target rotational speed) has continued (has existed) for a prescribed time or longer.

If it is determined in step S310 that the state of the real (actual) rotational speed being less than or equal to the target rotational speed has not continued for the prescribed or predetermined time or longer, then the setting process terminates. On the other hand, if it is determined that the state of the real (actual) rotational speed being less than or equal to the target rotational speed has continued for the predetermined or prescribed time or longer, then the process transitions to a step S320.

In step S320 the current advance angle adjustment amount is set (i.e., fixed) as the last value of the advance angle adjustment amount during the current cycle's motor drive, and thereby the completion of the advance angle adjustment is recorded and the setting process terminates. As a result, the advance angle adjustment amount is fixed to (held constant at) the current value until the drive (i.e., the rotation) of the motor 2 stops.

As explained above, according to the power tool 1 of the present embodiment, when the motor drive apparatus 10 starts the drive of the motor 2 and regulates the current conduction angle and the advance angle of the motor 2 to a reference set value according to the control described in procedure 1 through procedure 3 as shown in FIG. 5, the advance angle during motor drive is controlled such that the rotational speed of the motor 2 approaches or reaches the target rotational speed.

Therefore, according to the power tool 1 of the present embodiment, it is possible to provide a power tool that exhibits the same performance as other power tools that are nominally identical to that power tool while reducing or preventing variations in drive characteristics of the motor 2 (and, in turn, the power tool 1) caused by individual differences from one manufactured article to another, for example, as caused by manufacturing tolerances.

In particular, in the present embodiment, in controlling the advance angle of the motor 2, the advance angle adjustment amount is increased and decreased so that the rotational speed of the motor 2 approaches or reaches the target rotational speed, and therefore it is possible not only to retard the advance angle when the rotational speed of the motor 2 is high and the advance angle is excessive but also to further advance the advance angle if the rotational speed of the motor 2 is low and thus raise the rotational speed of the motor 2.

In addition, in the present embodiment, the target rotational speed when the advance angle is being controlled is set based on the battery voltage when the rotation of the motor 2 is stopped (in other words, when electric power is not being supplied from the battery 4 to the motor 2). Consequently, even if the battery voltage fluctuates while driving the motor 2, the target rotational speed can be set properly based on the battery voltage prior to that fluctuation. In addition, it is also possible to prevent or reduce occurrence of the situation in which, for example, the target rotational speed is set too high when the battery voltage is low, which would make the advance angle excessive and reduce the drive efficiency of the brushless motor 2.

Furthermore, in the present embodiment, the rotational speed of the motor 2 is regulated to the target rotational speed by increasing and decreasing the advance angle adjustment amount. Subsequently, if the rotational speed differential falls to or below the threshold value for the prescribed time or longer (namely, if the rotational speed of the motor 2 is regulated to within a permissible range centered at the target rotational speed), then the adjustment amount is fixed to the value at that time, and the advance angle adjustment of the motor 2 is complete.

Accordingly, after the rotational speed of the motor 2 converges to within the permissible range, even if the load applied to the power tool 1 (and, in turn, the motor 2) fluctuates and the rotational speed varies, the advance angle can be maintained at the optimal value without being affected by that load fluctuation.

Furthermore, in the present embodiment, the voltage detection circuit 16 is an example of a battery voltage detection unit of embodiments of the present disclosure, the Hall effect sensors 6, 7, 8 and the rotational position detection circuit 20 are examples of rotational position detection units of embodiments of the present disclosure, and the control circuit 30 is an example of a control unit of embodiments of the present disclosure.

One exemplary embodiment of the present disclosure was described in detail above, but the present invention is not limited to that embodiment, and it should be understood that variations and modifications may be effected without departing from the spirit and scope of the invention.

For example, in the abovementioned embodiment, the advance angle during motor drive is controlled such that the rotational speed of the motor 2 approaches or reaches the target rotational speed. However, the current conduction angle instead may be controlled, or both the advance angle and the current conduction angle may be controlled.

Furthermore, if the current conduction angle is controlled, then the adjustment amount is increased by a prescribed amount when the rotational speed of the motor 2 is less than the target rotational speed, thus widening the current conduction angle. When the rotational speed of the motor 2 is greater than the target rotational speed, the adjustment amount is reduced by a prescribed amount, and this narrows the current conduction angle.

In addition, in the control of the advance angle of the abovementioned embodiment, the target rotational speed is set based on the battery voltage when the rotation of the motor 2 is stopped, and the advance angle adjustment amount is increased or decreased such that the rotational speed of the motor 2 approaches or reaches the target rotational speed during motor drive. Alternately, however, the advance angle and/or the current conduction angle may be controlled such that the electric current, instead of the rotational speed, during motor drive approaches or reaches a target current as noted in brackets in FIG. 5. Specifically, for example, the target value map 36 may describes, based on an NT characteristic (rotational speed–torque characteristic), an IT characteristic (electric current–torque characteristic), and/or other relevant characteristics of the motor 2, the relationship between the battery voltage and the current to flow to the motor 2 at which the optimal drive characteristics are obtained. As shown by way of example in FIG. 4B, the target current is set for each of a plurality of prescribed battery voltages. In the process of setting the adjustment amount described in FIG. 3, in step S220, the target current may be set based on the battery voltage; in step S260 the electric current difference between the real (actual) current of the motor 2 detected by the current detection circuit 14 and the target current may be calculated; in step S270, it may be determined whether that calculated electric current difference exceeds a threshold value; and in step S280, it may be determined whether the real (actual) current is greater than the target current.

Furthermore, effects the same as those in the abovementioned embodiment can be obtained even if the advance angle and/or the current conduction angle are controlled such that the real (actual) current flowing to the motor 2 during motor drive approaches or reaches the target current.

In addition, in the abovementioned embodiment, the power tool 1 comprises the three phase brushless motor 2, and the motor drive apparatus 10 controls that three phase brushless motor. However, even if the motor 2 is a single phase motor, effects the same as those in the abovementioned embodiment can be obtained by adapting the present teachings for use with a single-phase motor.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools and/or improved control of brushless motors.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Lastly, it is noted that the present teachings can be applied to any type of electric power tool, including but not limited to electric power tools for processing metals, electric power tools for processing wood, electric power tools for processing stone, and electric power tools for gardening. Specific examples include, but are not limited to, electric drills, electric impact and screw drivers, electric impact wrenches, electric grinders, electric circular saws, electric reciprocating saws, electric jig saws, electric band saws, electric hammers, electric cutters, electric chain saws, electric planers, electric nailers (including electric rivet guns), electric staplers, electric shears, electric hedge trimmers, electric lawn clippers, electric lawn mowers, electric brush cutters, electric blowers (leaf blowers), electric flashlights, electric concrete vibrators and electric vacuum cleaners.

REFERENCE NUMERAL LIST

1 Power tool
2 Motor (brushless motor)
4 Battery
6, 7, 8 Hall sensors
10 Motor drive apparatus
12 Switching circuit
14 Current detection circuit
16 Voltage detection circuit
17 Temperature sensor
18 Temperature detection circuit
20 Rotational position detection circuit
22 Rotational speed calculating circuit
24 Operating part
30 Control circuit
32 Pulse width modulation (PWM) generating unit
34 Advance angle and current conduction angle generating unit
36 Target rotational speed map
37 Advance angle and current conduction angle map
38 Overcurrent detection unit
40 Drive signal generating unit

What is claimed is:

1. A power tool, comprising:
a brushless motor;
a battery voltage detection unit configured to detect a voltage of a battery that provides energy for driving the brushless motor;
a rotational position detection unit configured to detect a rotational position of the brushless motor; and
a control unit configured to control a drive output supplied to the brushless motor based at least in part on a signal from the rotational position detection unit;
wherein,
the control unit is configured to control a current conduction angle and/or an advance angle supplied to the brushless motor such that, during control of the drive output to the brushless motor, a rotational speed or a conducting current of the brushless motor reaches a target value based at least in part on a battery voltage detected by the battery voltage detection unit.

2. The power tool according to claim 1, wherein the control unit is configured to:
increase the rotational speed of the brushless motor by widening the current conduction angle and/or advancing the advance angle if the rotational speed of the brushless motor is lower than a target rotational speed, the target rotational speed being based at least in part on the battery voltage; and
decrease the rotational speed of the brushless motor by narrowing the current conduction angle and/or retarding the advance angle if the rotational speed of the brushless motor is higher than the target rotational speed.

3. The power tool according to claim 1, wherein the control unit is configured to:
increase the conducting current of the brushless motor by widening the current conduction angle and/or advancing the advance angle if the conducting current of the brushless motor is smaller than a target current, the target current being based at least in part on the battery voltage; and
decrease the conducting current of the brushless motor by narrowing the current conduction angle and/or retarding the advance angle if the conducting current of the brushless motor is larger than the target current.

4. The power tool according to claim 1, wherein the control unit is configured such that:
if the rotational speed or the conducting current of the brushless motor converges to within a predetermined range encompassing the target value, the control unit terminates control of the current conduction angle and/or the advance angle by fixing the current conduction angle and/or the advance angle.

5. The power tool according to claim 4, wherein the control unit is configured such that:
if the rotational speed or the conducting current of the brushless motor is within the predetermined range for a prescribed time or longer, then the control unit terminates control of the current conduction angle and/or the advance angle by fixing the current conduction angle and/or the advance angle.

6. The power tool according to claim 1, wherein the control unit is configured such that:
prior to starting the drive of the brushless motor, the control unit detects the battery voltage via the battery voltage detection unit and sets the target value based at least in part on the detected battery voltage.

7. The power tool according to claim 5, wherein the control unit is configured such that:
prior to starting the drive of the brushless motor, the control unit detects the battery voltage via the battery voltage detection unit and sets the target value based at least in part on the detected battery voltage.

8. The power tool according to claim 7, wherein the control unit is configured to:
increase the rotational speed of the brushless motor by widening the current conduction angle and/or advancing the advance angle if the rotational speed of the brushless motor is lower than a target rotational speed, the target rotational speed being based at least in part on the battery voltage; and
decrease the rotational speed of the brushless motor by narrowing the current conduction angle and/or retarding the advance angle if the rotational speed of the brushless motor is higher than the target rotational speed.

9. A power tool according to claim 8, wherein the control unit is configured to:
increase the conducting current of the brushless motor by widening the current conduction angle and/or advancing the advance angle if the conducting current of the brushless motor is smaller than a target current, the target current being based at least in part on the battery voltage; and
decrease the conducting current of the brushless motor by narrowing the current conduction angle and/or retarding the advance angle if the conducting current of the brushless motor is larger than the target current.

10. The power tool according to claim 1, wherein the target value is selected to optimize torque characteristics of the brushless motor.

11. A power tool, comprising:
a brushless motor having a rotor and having an input for receiving a control signal;
a battery voltage detection unit configured to detect a voltage of a battery electrically connected to the brushless motor;
a rotational position detection unit configured to detect a rotational position of the rotor of the brushless motor; and
a control unit configured to send a control signal to the input of the brushless motor for controlling a current conduction angle or an advance angle or both a current conduction angle and an advance angle of the brushless motor,
wherein,
the control unit is configured to control the current conduction angle or the advance angle or both the current conduction angle and the advance angle such that a rotational speed or a conducting current of the brushless motor reaches a target value, wherein the target value is based at least in part on a battery voltage detected by the battery voltage detection unit.

12. The power tool according to claim 11, wherein the control unit is configured such that:
if the rotational speed reaches an acceptable speed level within a predetermined range of acceptable speeds or if the conducting current reaches an acceptable current level within a predetermined range of current levels, the control unit stops changing the current conduction angle or stops changing the advance angle or stops changing both the current conduction angle and the advance angle.

13. The power tool according to claim 11, wherein the target value is selected to optimize torque characteristics of the brushless motor.

14. A method of controlling a power tool having a brushless motor and a battery for powering the brushless motor, the method comprising:
detecting a voltage of the battery;
detecting a rotational position of a rotor of the brushless motor;
determining a target rotational speed or a target conducting current for the brushless motor based at least in part on the detected voltage of the battery; and
controlling a current conduction angle and/or an advance angle of the brushless motor to cause a rotational speed of the brushless motor to reach the target rotational speed or to cause a conducting current of the brushless motor to reach the target conducting current.

15. The method according to claim 14, further comprising:
increasing the rotational speed of the brushless motor by widening the current conduction angle and/or advancing the advance angle, or
decreasing the rotational speed of the brushless motor by narrowing the current conduction angle and/or retarding the advance angle.

16. The method according to claim 14, further comprising:
increasing the conducting current of the brushless motor by widening the current conduction angle and/or advancing the advance angle; or
decreasing the conducting current of the brushless motor by narrowing the current conduction angle and/or retarding the advance angle.

17. The method according to claim 14, further comprising:
determining whether the rotational speed of the brushless motor is within a predetermined range encompassing the target rotational speed, and
if so, terminating control of the current conduction angle and/or the advance angle by holding constant the current conduction angle and/or the advance angle.

18. The method according to claim 14, further comprising:
determining whether the conducting current of the brushless motor is within a predetermined range encompassing the target conducting current, and
if so, terminating control of the current conduction angle and/or the advance angle by holding constant the current conduction angle and/or the advance angle.

19. The method according to claim 14, wherein the target rotational speed or the target conducting current is selected to optimize torque characteristics of the brushless motor.

* * * * *